United States Patent
Snook et al.

(10) Patent No.: US 9,127,598 B2
(45) Date of Patent: *Sep. 8, 2015

(54) CONTROL METHOD FOR STOICHIOMETRIC EXHAUST GAS RECIRCULATION POWER PLANT

(75) Inventors: Daniel David Snook, Greenville, SC (US); Lisa Anne Wichmann, Greenville, SC (US); Samuel David Draper, Greenville, SC (US); Noémie Dion Ouellet, Greenville, SC (US)

(73) Assignee: General Electric Company, Schenectady, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/217,630

(22) Filed: Aug. 25, 2011

(65) Prior Publication Data

US 2012/0023958 A1    Feb. 2, 2012

(51) Int. Cl.
*F02C 3/34* (2006.01)
*F01D 13/02* (2006.01)
(Continued)

(52) U.S. Cl.
CPC . *F02C 3/34* (2013.01); *F01D 13/02* (2013.01); *F02C 1/08* (2013.01); *F02C 6/08* (2013.01); *Y02T 50/676* (2013.01)

(58) Field of Classification Search
CPC ............... F02C 3/34; F02C 1/08; F02C 6/08; Y02T 50/676; F01D 13/02
USPC ........... 60/39.182, 39.52, 772, 776, 782, 783, 60/784

See application file for complete search history.

(56) References Cited

U.S. PATENT DOCUMENTS 2,621,475 A    12/1952 Loy
2,646,663 A *   7/1953 Sedille ................ 60/39.17
(Continued)

FOREIGN PATENT DOCUMENTS

CN    101033753 A    9/2007
EP    1731833 A1    12/2006
(Continued)

OTHER PUBLICATIONS

Bandar Duraya Al-Anazi, "Enhanced Oil Recovery Techniques and Nitrogen Injection," CSEG Recorder, Oct. 2007, pp. 28-33.
(Continued)

*Primary Examiner* — Phutthiwat Wongwian
*Assistant Examiner* — Michael B Mantyla
(74) *Attorney, Agent, or Firm* — Sutherland Asbill & Brennan LLP

(57) ABSTRACT

Ambient air is compressed into a compressed ambient gas flow with a main air compressor. The compressed ambient gas flow having a compressed ambient gas flow rate is delivered to a turbine combustor and mixed with a fuel stream having a fuel stream flow rate and a portion of a recirculated low oxygen content gas flow to form a combustible mixture. The combustible mixture is burned and forms the recirculated low oxygen content gas flow that drives a turbine. A portion of the recirculated low oxygen content gas flow is recirculated from the turbine to the turbine compressor using a recirculation loop. The compressed ambient gas flow rate and the fuel stream flow rate are adjusted to achieve substantially stoichiometric combustion. An excess portion, if any, of the compressed ambient gas flow is vented. A portion of the recirculated low oxygen content gas flow is extracted using an extraction conduit.

17 Claims, 2 Drawing Sheets

(51) Int. Cl.
*F02C 6/08* (2006.01)
*F02C 1/08* (2006.01)

(56) References Cited

U.S. PATENT DOCUMENTS

| | | | |
|---|---|---|---|
| 3,659,417 A | 5/1972 | Grieb | |
| 3,685,287 A | 8/1972 | Dooley | |
| 3,771,969 A | 11/1973 | Scheitlin | |
| 3,866,411 A | 2/1975 | Marion et al. | |
| 3,875,380 A | 4/1975 | Rankin | |
| 3,943,703 A | 3/1976 | Kronogard | |
| 3,949,548 A | 4/1976 | Lockwood, Jr. | |
| 4,267,692 A | 5/1981 | Earnest | |
| 4,271,664 A * | 6/1981 | Earnest | 60/39.181 |
| 4,313,300 A | 2/1982 | Wilkes et al. | |
| 4,330,038 A | 5/1982 | Soukup et al. | |
| 4,434,613 A | 3/1984 | Stahl | |
| 4,492,085 A | 1/1985 | Stahl et al. | |
| 4,528,811 A | 7/1985 | Stahl | |
| 4,530,207 A * | 7/1985 | Brannstrom | 60/39.464 |
| 4,533,314 A | 8/1985 | Herberling | |
| 4,561,245 A | 12/1985 | Ball | |
| 4,566,267 A | 1/1986 | Muller et al. | |
| 4,622,808 A * | 11/1986 | Kenison et al. | 60/795 |
| 4,766,721 A * | 8/1988 | Iizuka et al. | 60/39.23 |
| 5,165,606 A | 11/1992 | Pelet | |
| 5,341,636 A | 8/1994 | Paul | |
| 5,361,576 A | 11/1994 | Muller | |
| 5,400,587 A | 3/1995 | Keller et al. | |
| 5,426,932 A | 6/1995 | Morihara et al. | |
| 5,557,919 A | 9/1996 | Althaus | |
| 5,564,896 A | 10/1996 | Beeck et al. | |
| 5,584,182 A | 12/1996 | Althaus et al. | |
| 5,595,059 A | 1/1997 | Huber et al. | |
| 5,674,066 A | 10/1997 | Hausermann et al. | |
| 5,724,805 A | 3/1998 | Golomb et al. | |
| 5,794,431 A | 8/1998 | Utamura et al. | |
| 5,809,768 A | 9/1998 | Uematsu et al. | |
| 5,822,992 A | 10/1998 | Dean | |
| 6,050,082 A | 4/2000 | Leonard et al. | |
| 6,082,093 A | 7/2000 | Greenwood et al. | |
| 6,105,362 A * | 8/2000 | Ohtomo et al. | 60/39.182 |
| 6,202,400 B1 | 3/2001 | Utamura et al. | |
| 6,256,976 B1 | 7/2001 | Kataoka et al. | |
| 6,269,624 B1 | 8/2001 | Frutschi et al. | |
| 6,289,666 B1 | 9/2001 | Ginter | |
| 6,338,240 B1 | 1/2002 | Endo et al. | |
| 6,363,709 B2 | 4/2002 | Kataoka et al. | |
| 6,430,915 B1 * | 8/2002 | Wiant et al. | 60/39.12 |
| 6,584,775 B1 * | 7/2003 | Schneider et al. | 60/775 |
| 6,622,470 B2 | 9/2003 | Viteri et al. | |
| 6,637,183 B2 | 10/2003 | Viteri et al. | |
| 6,848,249 B2 | 2/2005 | Coleman et al. | |
| 6,851,266 B2 | 2/2005 | Liebig | |
| 6,868,677 B2 | 3/2005 | Viteri et al. | |
| 6,910,335 B2 | 6/2005 | Viteri et al. | |
| 7,007,487 B2 | 3/2006 | Belokon et al. | |
| 7,032,388 B2 | 4/2006 | Healy | |
| 7,089,743 B2 * | 8/2006 | Frutschi et al. | 60/772 |
| 7,107,774 B2 | 9/2006 | Radovich | |
| 7,127,898 B2 | 10/2006 | Healy | |
| 7,383,686 B2 | 6/2008 | Aycock et al. | |
| 7,490,472 B2 | 2/2009 | Lynghjem et al. | |
| 7,503,178 B2 | 3/2009 | Bucker et al. | |
| 7,516,609 B2 * | 4/2009 | Agnew | 60/39.52 |
| 7,726,114 B2 | 6/2010 | Evulet | |
| 7,739,864 B2 | 6/2010 | Finkenrath et al. | |
| 7,895,822 B2 | 3/2011 | Hoffmann et al. | |
| 7,980,052 B1 * | 7/2011 | Paulino | 60/39.15 |
| 8,172,521 B2 | 5/2012 | Tillery et al. | |
| 8,205,455 B2 | 6/2012 | Popovic | |
| 8,245,492 B2 * | 8/2012 | Draper | 60/39.52 |
| 8,245,493 B2 * | 8/2012 | Minto | 60/39.52 |
| 8,266,883 B2 * | 9/2012 | Dion Ouellet et al. | 60/39.52 |
| 8,266,913 B2 * | 9/2012 | Snook et al. | 60/772 |
| 8,347,600 B2 * | 1/2013 | Wichmann et al. | 60/39.52 |
| 8,453,461 B2 * | 6/2013 | Draper | 60/773 |
| 8,453,462 B2 * | 6/2013 | Wichmann et al. | 60/773 |
| 2003/0051481 A1 | 3/2003 | Priestley et al. | |
| 2003/0221409 A1 | 12/2003 | McGowan | |
| 2004/0011057 A1 | 1/2004 | Huber | |
| 2004/0134194 A1 | 7/2004 | Roby et al. | |
| 2004/0200205 A1 | 10/2004 | Frutschi et al. | |
| 2005/0028529 A1 | 2/2005 | Bartlett et al. | |
| 2005/0076645 A1 | 4/2005 | Frutschi et al. | |
| 2005/0150229 A1 | 7/2005 | Baer et al. | |
| 2007/0006592 A1 | 1/2007 | Balan et al. | |
| 2007/0034171 A1 | 2/2007 | Griffin et al. | |
| 2007/0068167 A1 | 3/2007 | Patel et al. | |
| 2007/0125063 A1 | 6/2007 | Evulat | |
| 2007/0125064 A1 * | 6/2007 | Sonoda et al. | 60/39.182 |
| 2007/0125091 A1 * | 6/2007 | Roby et al. | 60/776 |
| 2007/0220896 A1 | 9/2007 | Varatharajan et al. | |
| 2008/0010967 A1 | 1/2008 | Griffin et al. | |
| 2008/0104938 A1 * | 5/2008 | Finkenrath et al. | 60/39.5 |
| 2008/0104939 A1 | 5/2008 | Hoffmann et al. | |
| 2008/0120960 A1 | 5/2008 | Agnew | |
| 2008/0309087 A1 | 12/2008 | Evulet et al. | |
| 2009/0078587 A1 | 3/2009 | Farber | |
| 2009/0199566 A1 | 8/2009 | Lebas et al. | |
| 2009/0218821 A1 | 9/2009 | Elkady et al. | |
| 2009/0280003 A1 | 11/2009 | Schriner et al. | |
| 2009/0284013 A1 | 11/2009 | Anand et al. | |
| 2009/0301054 A1 | 12/2009 | Simpson et al. | |
| 2010/0018218 A1 | 1/2010 | Riley et al. | |
| 2010/0115960 A1 | 5/2010 | Brautsch et al. | |
| 2010/0126181 A1 | 5/2010 | Ranasinghe et al. | |
| 2010/0170218 A1 | 7/2010 | Eluripati et al. | |
| 2010/0180565 A1 | 7/2010 | Draper | |
| 2011/0067408 A1 | 3/2011 | Maly | |
| 2011/0138766 A1 | 6/2011 | Elkady et al. | |
| 2011/0289898 A1 | 12/2011 | Hellat et al. | |
| 2012/0023958 A1 | 2/2012 | Snook et al. | |

FOREIGN PATENT DOCUMENTS

| | | |
|---|---|---|
| EP | 2078827 A1 | 7/2009 |
| EP | 2206959 A2 | 7/2010 |
| JP | 57-81125 A | 5/1982 |
| JP | 3-37333 A | 2/1991 |

OTHER PUBLICATIONS

Supplemental Disclosure Under 37 C.F.R. § 1.56 dated Apr. 30, 2012 for U.S. Appl. No. 13/217,630.

Supplemental Disclosure under 37 CFR 1.56 for U.S. Appl. No. 13/217,630, filed Mar. 24, 2014.

Chinese Office Action dated Jul. 3, 2015 for Application No. CN 201210305284.6.

* cited by examiner

CONTROL METHOD FOR STOICHIOMETRIC EXHAUST GAS RECIRCULATION POWER PLANT

BACKGROUND OF THE INVENTION

The subject matter of the present disclosure relates generally to the field of electric power plants, and more particularly to methods of controlling stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a method for controlling a stoichiometric exhaust gas recirculation power plant arrangement is provided. Ambient air is compressed into a compressed ambient gas flow with at least one main air compressor. At least a first portion of the compressed ambient gas flow is delivered, with a compressed ambient gas flow rate, to a turbine combustor that is fluidly connected to the at least one main air compressor. A fuel stream is delivered, having a fuel stream flow rate, to the turbine combustor for mixing with the at least a first portion of the compressed ambient gas flow and with at least a first portion of a recirculated low oxygen content gas flow to form a combustible mixture. The combustible mixture is burned in the turbine combustor and thereby forms the recirculated low oxygen content gas flow and drives a turbine connected to a turbine compressor via a turbine shaft. At least a first portion of the recirculated low oxygen content gas flow is recirculated from the turbine to the turbine compressor using a recirculation loop. The compressed ambient gas flow rate and the fuel stream flow rate are adjusted to achieve substantially stoichiometric combustion. An excess portion, if any, of the at least a first portion of the compressed ambient gas flow is vented. At least a second portion of the recirculated low oxygen content gas flow is extracted using an extraction conduit that is fluidly connected to the turbine compressor.

In another aspect, a method for controlling at least one master train of a stoichiometric exhaust gas recirculation power plant is provided. Ambient air is compressed into a compressed ambient gas flow with at least one main air compressor. At least a first portion of the compressed ambient gas flow is delivered, with a master compressed ambient gas flow rate, to a master turbine combustor that is fluidly connected to the at least one main air compressor. A master fuel stream, having a master fuels stream flow rate, is delivered to the master turbine combustor for mixing with the at least a first portion of the compressed ambient gas flow and with at least a first portion of a master recirculated low oxygen content gas flow to form a master combustible mixture. The master combustible mixture is burned in the master turbine combustor, thereby forming the master recirculated low oxygen content gas flow and driving a master turbine connected to a master turbine compressor via a master turbine shaft. The at least a first portion of the master recirculated low oxygen content gas flow is recirculated from the master turbine to the master turbine compressor using a master recirculation loop. The master compressed ambient gas flow rate and the master fuel stream flow rate are adjusted to achieve substantially stoichiometric combustion. An excess portion, if any, of the at least a first portion of the compressed ambient gas flow is vented. At least a second portion of the master recirculated low oxygen content gas flow is extracted using a master extraction conduit that is fluidly connected to the master turbine compressor.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

Figure 1:
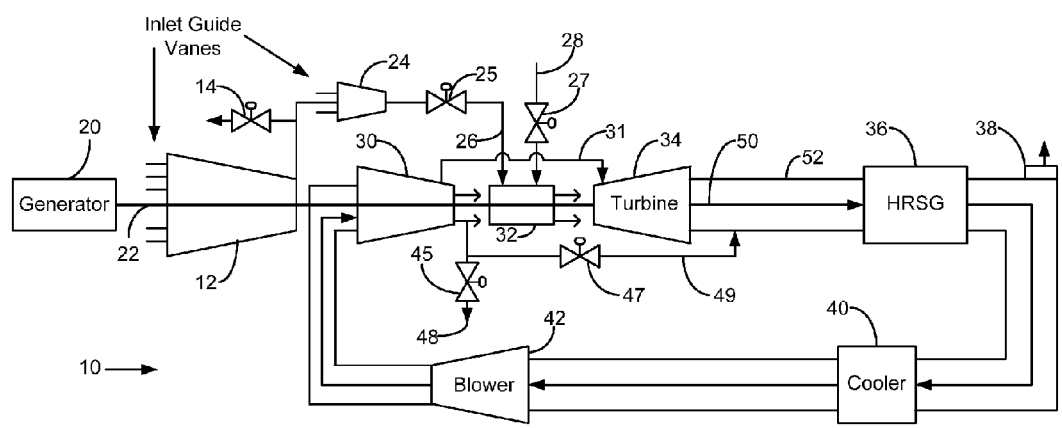
FIG. 1 is a diagrammatical illustration of an exemplary power plant arrangement 10 in accordance with an embodiment of the present invention.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume almost all of the oxygen in the air working fluid to produce a substantially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, an essentially oxygen-free exhaust stream may be more easily suited to enhanced oil recovery applications.

A substantially oxygen-free exhaust stream from a gas turbine may be accomplished by stoichiometric burning in the combustion system. That is, the oxygen-containing fresh air supply may be matched to the fuel flow such that the combustion process operates substantially stoichiometrically.

A stoichiometric combustion reaction of methane and oxygen is illustrated below:

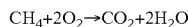

Stoichiometric combustion may result in gas temperatures much too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be substantially oxygen-free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. In some situations, it may be necessary to discharge some of the air compressed by the auxiliary compressor to the atmosphere.

As discussed in detail below, embodiments of the presently disclosed subject matter may be used to control a power plant that is configured to minimize emissions by using as SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be substantially free of $NO_x$ contaminants. The exhaust stream may be applied to enhanced oil recovery applications, may be ideal for carbon capture and storage (CCS) processes, or may be useful in any process where a diluent is required with a low oxygen content. In some of the specific embodiments, the present technique includes using the SEGR cycle to provide low oxygen content streams of carbon dioxide, nitrogen, and/or water.

Power Plant Arrangements

Turning now to the drawings and referring first to FIG. 1 a power plant arrangement 10 is illustrated. The power plant arrangement 10 includes a main air compressor 12 for compressing ambient air into at least a first portion of a compressed ambient gas flow 26. The power plant arrangement 10 may include a turbine combustor 32 that may be fluidly connected to the main air compressor 12. The flow of the at least a first portion of the compressed ambient gas flow 26 to the turbine combustor 32 may be regulated to deliver the at least a first portion of the compressed ambient gas flow 26 with a compressed ambient gas flow rate. An air injection valve 25 may also be used to control the delivery of the at least a first portion of the compressed ambient gas flow 26 to the turbine combustor.

An excess portion, if any, of the at least a first portion of the compressed ambient gas flow 26 may be vented to the atmosphere via a variable bleed valve 14. Such venting may be necessary, for instance, to prevent an overflow of air into the turbine compressor 30 or to prevent a buildup of backpressure into the main air compressor 12, thereby preventing a surge.

The turbine combustor 32 may be configured to receive the at least a first portion of the compressed ambient gas flow 26 from the main air compressor 12, at least a first portion of a recirculated low oxygen content gas flow 50 from a turbine compressor 30, and a fuel stream 28, to form a combustible mixture and to burn the combustible mixture to generate the recirculated low oxygen content gas flow 50. In some embodiments, the fuel stream 28 may be regulated by a gas control valve 27 to deliver a fuel stream flow rate.

In addition, the power plant arrangement 10 may comprise a turbine 34 located downstream of the turbine combustor 32. The turbine 34 may be configured to expand the recirculated low oxygen content gas flow 50 and may drive an external load such as a turbine generator 20 via a turbine shaft 22 to generate electricity. In the illustrated embodiment 10, the main air compressor 12 and the turbine compressor 30 may be driven by the power generated by the turbine 34 via the turbine shaft 22.

At least a second portion of the recirculated gas flow 50 from the output of the turbine compressor 30 may be extracted through an extraction conduit 48 which may be regulated by an extraction valve 45. In some embodiments, the extraction valve 45 may be fluidly connected to a bypass conduit 49 at a point that is either upstream of or downstream from a turbine bypass valve 47. In some embodiments, the extraction conduit 48 may be fluidly connected to a gas separation system such as a carbon capture sequestration (CCS) system. In still other embodiments, the gas separation system may produce a stream of concentrated carbon dioxide and concentrated nitrogen, both with a low oxygen content. In some embodiments, the extraction valve 45 may be adjusted to maintain a constant mass balance in the power plant arrangement 10. As used herein, the term "constant mass balance" means that the system inputs, including fuel and air, are balanced with the system outputs via extraction, including carbon dioxide, nitrogen, and water.

In some embodiments, the main air compressor 12 may further comprise adjustable inlet guide vanes to control the flow of air into the main air compressor 12. The inlet guide vanes of the main air compressor may be used to regulate the compressed ambient gas flow rate and pressure that is delivered to the turbine combustor 32. In some embodiments, the turbine compressor 30 may further comprise adjustable inlet guide vanes to control the flow of air into the turbine compressor 30.

As used herein, the term "recirculated low oxygen content gas flow" refers to the gas flow generated by the burning of the combustible mixture in the turbine combustor 32 and flowing through a recirculation loop 52. In some embodiments, the term "low oxygen content" refers to an oxygen content of below about 5 vol %, below about 2 vol %, or below about 1 vol %. The concentration of oxygen present in the recirculated low oxygen content gas flow 50 may be detected upon exit from the turbine compressor 30 using a first oxygen sensor or upon exit from the turbine 34 using a second oxygen sensor or both.

As used herein, the term "gas turbine assembly" refers to all listed components of the power plant arrangements except for the main air compressor 12. In embodiments comprising multiple main air compressors, the term "gas turbine assembly" refers to all listed components of the power plant arrangements except for the multiple main air compressors.

In some embodiments, the recirculated low oxygen content gas flow 50 may be directed from the turbine 34 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated low oxygen content gas flow 50 may then be directed back into the recirculation loop 52 to a recirculated gas flow cooler 40. In still other embodiments, the recirculation loop 52 may not contain a heat recovery steam generator 36 and the recirculated low oxygen content gas flow 50 may instead be introduced directly into the recirculated gas flow cooler 40 upon exit from the turbine 34. In other embodiments, the recirculation loop 52 may not comprise the recirculated gas flow cooler 40.

The recirculated gas flow cooler 40 may be incorporated into the recirculation loop 52 anywhere downstream from the turbine 34. The recirculated gas flow cooler 40 may be configured to lower the temperature of the recirculated low oxygen content gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, the gas turbine assembly may further comprise a secondary flow path 31 that delivers at least a third portion of the recirculated low oxygen content gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 downstream of the turbine 34.

In some embodiments, the exemplary power plant arrangement 10 may include a bypass conduit 49 located downstream of the turbine compressor 30 and may be in fluid connection with a portion of the recirculated gas flow 50 from the output of the turbine compressor 30. In some embodiments, a bypass flow through the bypass conduit 49 may be regulated by a turbine bypass valve 47. The turbine bypass valve 47 may be used to adjust a bypass flow rate through the bypass conduit 49. In some embodiments, the bypass flow may be fluidly connected to the recirculation loop 52 downstream of the turbine 34.

In some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32. In some embodiments, the compressed ambient gas flow rate may be varied by adjusting the speed of the booster compressor 24 and/or the inlet guide vanes of the booster compressor 24.

In still other embodiments, a blower 42 may be fluidly connected to the recirculation loop 52 upstream of or downstream from the recirculated gas flow cooler 40. The blower 42 may be configured to increase the pressure of the recirculated low oxygen content gas flow 50 prior to delivery into the turbine compressor 30 via the recirculation loop 52.

In some embodiments, an exhaust port to the atmosphere may be in fluid communication with the gas turbine assembly and may be located anywhere between an output of the turbine compressor 30 and an input of the turbine compressor 30. In some embodiments, the power plant arrangement 10 may include a damper door 38 connected to the recirculation loop 52. The damper door 38 may be opened to vent a portion of the recirculated gas flow 50 to the atmosphere.

As illustrated by FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

As used herein, the term "slave" is synonymous with the terms secondary, auxiliary, or additional. In the following embodiments, the term "slave" refers to the second of two gas turbine assemblies, but can also mean any additional gas turbine assemblies operated with a main gas turbine assembly such as is the second gas turbine assembly in the following embodiments. Furthermore, the term "master train" is synonymous with a master gas turbine assembly, while the term "slave train" is synonymous with a slave gas turbine assembly.

Figure 2:
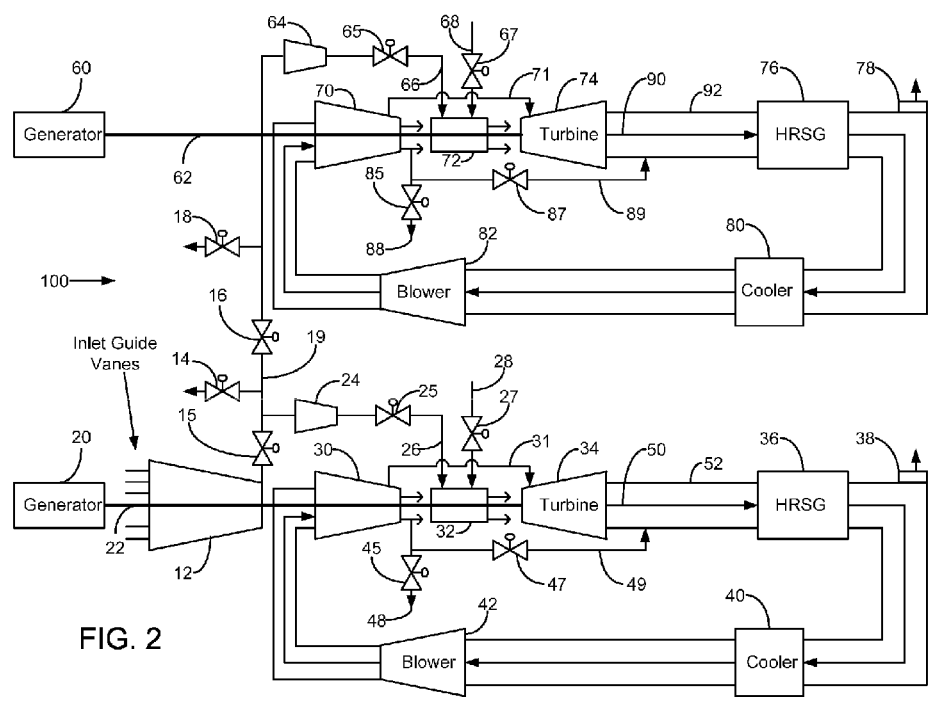
FIG. 2 is diagrammatical illustration of another exemplary power plant arrangement 100 in accordance with an embodiment of the present invention.

As illustrated in FIG. 2, in some embodiments, the main air compressor 12 may deliver compressed ambient gas to a slave turbine combustor 72 that may be fluidly connected to the main air compressor 12 via an inter-train conduit 19. In some embodiments, the flow of the compressed ambient gas into the inter-train conduit 19 may be controlled by an air supply valve 15. The flow of the compressed ambient gas through the inter-train conduit 19 may be further regulated by an inter-train valve 16 to create at least a second portion of a compressed ambient gas flow 66. In some embodiments, the at least a second portion of the compressed ambient gas flow 66 may be vented to the atmosphere via a slave variable bleed valve 18. In some embodiments, the flow of the at least a second portion of the compressed ambient gas flow 66 to a slave turbine combustor 72 may be regulated by a slave air injection valve 65 to deliver the at least a second portion of the compressed ambient gas flow 66 with a slave compressed ambient gas flow rate.

An excess portion, if any, of the at least a second portion of the compressed ambient gas flow 66 may be vented to the atmosphere via a slave variable bleed valve 18. Such venting may be necessary, for instance, to prevent an overflow of air into the slave turbine compressor 72 or to prevent a buildup of backpressure into the main air compressor 12, thereby preventing a surge.

The slave turbine combustor 72 may be configured to receive the at least a second portion of the compressed ambient gas flow 66 from the main air compressor 12, a slave recirculated gas flow 90 from a slave turbine compressor 70, and a slave fuel stream 68, to form a slave combustible mixture and to burn the slave combustible mixture to generate the slave recirculated gas flow 90. In some embodiments, the slave fuel stream 68 may be regulated by a slave gas control valve 67 to regulate a slave fuel stream flow rate. In addition, the exemplary power plant arrangement 100 may include a slave turbine 74 located downstream of the slave turbine combustor 72. The slave turbine 74 may be configured to expand the slave recirculated gas flow 90 and may drive an external load such as a slave turbine generator 60 via a slave turbine shaft 62 to generate electricity.

In some embodiments, the slave turbine compressor 70 may further comprise adjustable inlet guide vanes to control the flow of air into the slave turbine compressor 70.

At least a second portion of the slave recirculated gas flow 90 from the output of the slave turbine compressor 70 may be extracted through a slave extraction conduit 88 which may be regulated by a slave extraction valve 85. In some embodiments, the slave extraction valve 85 may be fluidly connected to the slave bypass conduit 89 at a point that is either upstream of or downstream from the slave turbine bypass valve 87. In some embodiments, the slave extraction conduit 88 may be fluidly connected to a slave gas separation system such as a carbon capture sequestration (CCS) system. In still other embodiments, the slave gas separation system may produce a stream of concentrated carbon dioxide and concentrated nitrogen, both with a low oxygen content. In some embodiments, the slave extraction valve 85 may be adjusted to maintain a constant mass balance in the power plant arrangement 100. As used herein, the term "constant mass balance" means that the system inputs, including fuel and air, are balanced with the system outputs via extraction, including carbon dioxide, nitrogen, and water.

As used herein, the term "slave recirculated low oxygen content gas flow" refers to the gas flow generated by burning of the slave combustible mixture in the slave turbine combustor 72 and flowing through a slave recirculation loop 92. As used herein, the term "low oxygen content" refers to an oxygen content of below about 5 vol %, below about 2 vol %, or below about 1 vol %. The concentration of oxygen present in the slave recirculated low oxygen content gas flow 90 may be detected upon exit from the slave turbine compressor 70 using a slave first oxygen sensor or upon exit from the slave turbine 74 using a slave second oxygen sensor or both.

In some embodiments, the gas turbine assembly may further comprise a slave secondary flow path 71 that may deliver a portion of the slave recirculated gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the slave recirculated gas flow 90 may be directed from the slave turbine combustor 72 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave heat recovery steam generator 76 may be configured to generate additional electricity when the temperature of the slave recirculated gas flow 90 is in the range from about 200° C. to about 700° C., from about 260° C. to about 600° C., or from about 300° C. to about 550° C. In some embodiments, the slave steam turbine may be arranged to be connected to the slave turbine shaft 62. The slave recirculated gas flow 90 may then be directed back into the slave recirculation loop 92 to a slave recirculated gas flow cooler 80. In still other embodiments, the recirculation loop 92 may not contain a slave heat recovery steam generator 76 and the slave recirculated gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream of the slave turbine 74. The slave recirculated gas flow cooler 80 may be configured to lower the temperature of the slave recirculated gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, the exemplary power plant arrangement 100 may include a slave bypass conduit 89 located downstream from the slave turbine compressor 70 and may be in fluid connection with a portion of the slave recirculated gas flow 90 from the output of the slave turbine compressor 70. In some embodiments, a slave bypass flow through the slave bypass conduit 89 may be regulated by a slave turbine bypass valve 87. The slave turbine bypass valve 87 may be used to adjust a slave bypass flow rate through the slave bypass conduit 89. In some embodiments, the slave bypass flow may be fluidly connected to the slave recirculation loop 92 downstream of the slave turbine 74.

In some embodiments, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. In some embodiments, the slave compressed ambient gas flow rate may be varied by adjusting the speed of the slave booster compressor 64 and/or by adjusting the inlet guide vanes of the slave booster compressor 64.

In some embodiments, a slave blower 82 may be fluidly connected to the slave recirculation loop 92 upstream of or downstream from the slave recirculated gas flow cooler 80. The slave blower 82 may be configured to increase the pressure of the slave recirculated gas flow 90 prior to delivery into the slave turbine compressor 70 via the slave recirculation loop 92.

In some embodiments, a slave exhaust port to the atmosphere may be in fluid communication with the slave gas turbine assembly and may be located anywhere between an output of the slave turbine compressor 70 and an input of the slave turbine compressor 70. In some embodiments, the exemplary power plant arrangement 100 may include a slave damper door 78 connected to the slave recirculation loop 92. The slave damper door 78 may be opened to vent a portion of the slave recirculated gas flow 90 to the atmosphere.

As illustrated by FIG. 2, in some embodiments, the slave turbine shaft 62 may be a "cold-end drive" configuration, meaning the slave turbine shaft 62 may connect to the slave turbine generator 60 at the compressor end of the salve turbine assembly. In other embodiments, the slave turbine shaft 62 may be a "hot-end drive" configuration, meaning the slave turbine shaft 62 may connect to the slave turbine generator 60 at the turbine end of the slave turbine assembly.

In some embodiments, the power plant arrangement comprises one gas turbine assembly. In other embodiments, the power plant arrangement comprises two or more gas turbine assemblies that are fluidly connected by an inter-train conduit 19. As used herein, the term "inter-train conduit" may refer to a fluid connection between two or more gas turbine assemblies and one or more main air compressors. In still other embodiments, the power plant arrangement comprises three or more gas turbine assemblies and one or more additional main air compressors, wherein the additional main air compressors are in fluid connection with each other and with the gas turbine assemblies. In some embodiments, the power plant is controllable to operate substantially stoichiometrically, meaning that the power plant arrangement is configured for substantially stoichiometric combustion. In still other embodiments, the power plant arrangement may be configured for substantially zero emissions power production.

In some embodiments, the master fuel stream 28 and/or the slave fuel stream 68 may comprise an organic gas, including but not limited to methane, propane, and/or butane. In still other embodiments, the master fuel stream 28 and/or the slave fuel stream 68 may comprise an organic liquid, including but not limited to methanol and/or ethanol. In yet other embodiments, the master fuel stream 28 and/or the slave fuel stream 68 may comprise a fuel source obtained from a solid carbonaceous material such as coal.

Control Method

A control method may be used to maximize the carbon capture system extraction from a stoichiometric exhaust gas recirculation power plant. At a high level, maximizing extraction from the power plant may be controlled by several parameters. The fuel and the compressed ambient air may be mixed and burned at the correct ratio to sustain stoichiometric combustion. The content of oxygen and/or carbon dioxide products from the combustion reaction may be measured and the fuel flow rate may be fine-tuned to minimize the presence of both oxygen and carbon dioxide in the combustion reaction products. The fuel flow rate and carbon capture extraction rate may be modulated to maintain a constant mass balance in the recirculation loop. This may be accomplished by pressure measurement, wherein an increase in pressure would suggest that additional extraction is needed. Once the oxygen and carbon dioxide levels are at a minimum and the system mass balance is stable, then the compressed ambient gas flow rate, the fuel flow rate, and extraction rate may be increased in proportion to maintaining the oxygen and carbon dioxide levels and system mass balance with fine adjustments to the fuel flow rate and extraction rate. Ideally, the compressed ambient gas flow rate, the fuel flow rate, and the extraction rate may be increased until the temperature limits of the turbine combustor, turbine, and exhaust system are reached.

In operation, a method for controlling a stoichiometric exhaust gas recirculation power plant arrangement 10 is provided, wherein ambient air is compressed using a main air compressor 12 to form at least a first portion of a compressed ambient gas flow 26. An excess portion, if any, of the at least a first portion of the compressed ambient gas flow 26 may be vented to the atmosphere via a variable bleed valve 14.

At least a first portion of the compressed ambient gas flow 26, having a compressed ambient gas flow rate, may be delivered to a turbine combustor 32 that is fluidly connected to the main air compressor 12. A fuel stream 28, having a fuel stream flow rate, may also be delivered to the turbine combustor 32. The at least a first portion of the compressed ambient gas flow 26 may then be mixed with at least a first portion of a recirculated low oxygen content gas flow 50 and the fuel stream 28 to form a combustible mixture. The combustible mixture may be burned in the turbine combustor 32 to produce the recirculated low oxygen content gas flow 50. In some embodiments, the fuel stream flow rate may be controlled by a gas control valve 27.

A turbine 34 may be driven using the recirculated low oxygen content gas flow 50, thereby causing the turbine 34 to rotate. As used herein, the term "driven using the recirculated low oxygen content gas flow" means the recirculated low oxygen content gas flow 50 expands upon exit from the turbine combustor 32 and upon entrance into the turbine 34, thereby causing the turbine 34 to rotate.

The rotation of the turbine 34 may cause the turbine shaft 22 and also the turbine compressor 30 to rotate. The turbine shaft 22 may rotate in a turbine generator 20, such that rotation of the turbine shaft 22 may cause the turbine generator 20 to generate electricity. In embodiments, the turbine compressor 30 may be fluidly connected to the turbine combustor 32 such that the turbine compressor 30 may compress and deliver the recirculated low oxygen content gas flow 50 to the turbine combustor 32.

At least a second portion of the recirculated low oxygen content gas flow 50 from the output of the turbine compressor 30 may be extracted through an extraction conduit 48 which may be regulated by an extraction valve 45. In some embodiments, the extraction valve 45 may be fluidly connected to a bypass conduit 49 at a point that is either upstream of or downstream of a turbine bypass valve 47. In some embodiments, the extraction conduit 48 may be fluidly connected to a gas separation system such as a carbon capture sequestration (CCS) system. In still other embodiments, the gas separation system may produce a stream of concentrated carbon dioxide and concentrated nitrogen, both with a low oxygen content. In some embodiments, the extraction valve 45 may be adjusted to maintain a constant mass balance in the power plant arrangement 10. As used herein, the term "constant mass balance" means that the system inputs, including fuel and air, are balanced with the system outputs via extraction, including carbon dioxide, nitrogen, and water.

The compressed ambient gas flow rate and the fuel stream flow rate may be adjusted to achieve substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. In some embodiments, the compressed ambient gas flow rate and/or the fuel stream flow rate may be adjusted based on measurements of oxygen and/or carbon dioxide present in the exhaust of the turbine 34 and/or in the recirculated low oxygen content gas flow 50.

In some embodiments, the main air compressor 12 may further comprise adjustable inlet guide vanes to control the flow of air into the main air compressor 12. The inlet guide vanes of the main air compressor may be used to regulate the compressed ambient gas flow rate that is delivered to the turbine combustor 32. In some embodiments, the turbine compressor 30 may further comprise adjustable inlet guide vanes to control the flow of air into the turbine compressor 30.

As illustrated in FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

As used herein, the term "recirculated low oxygen content gas flow" refers to the gas flow generated by the burning of the combustible mixture in the turbine combustor 32 and flowing through a recirculation loop 52. In some embodiments, the term "low oxygen content" refers to an oxygen content of below about 5 vol %, below about 2 vol %, or below about 1 vol %. The concentration of oxygen present in the recirculated low oxygen content gas flow 50 may be detected, upon exit from the turbine compressor 30 using a first oxygen sensor or upon exit from the turbine 34 using a second oxygen sensor or both.

In some embodiments, the recirculated low oxygen content gas flow 50 may be directed from the turbine 34 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated low oxygen content gas flow 50 may then be directed back into the recirculation loop 52 to a recirculated gas flow cooler 40. In still other embodiments, the recirculation loop 52 may not contain a heat recovery steam generator 36 and the recirculated low oxygen content gas flow 50 may instead be introduced directly into the recirculated gas flow cooler 40 upon exit from the turbine 34. In other embodiments, the recirculation loop 52 may not comprise the recirculated gas flow cooler 40.

The recirculated gas flow cooler 40 may be incorporated into the recirculation loop 52 anywhere downstream from the turbine 34. The recirculated gas flow cooler 40 may be configured to lower the temperature of the recirculated low oxygen content gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, at least a third portion of the recirculated low oxygen content gas flow 50 may be delivered from the turbine compressor 30 to the turbine 34 as a secondary flow. The gas turbine assembly may further comprise a secondary flow path 31 that delivers at least a second portion of the recirculated low oxygen content gas flow 50 from the turbine compressor 30 to the turbine 34 as a secondary flow. The secondary flow may be used to cool and seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments, the turbine combustor 32 may be bypassed with at least a portion of the recirculated low oxygen content gas flow 50 using a bypass conduit 49. The bypass conduit 49 may be located downstream of the turbine compressor 30 and may be in fluid connection with a portion of the recirculated gas flow 50 from the output of the turbine compressor 30. In some embodiments, a bypass flow through the bypass conduit 49 may be regulated by a turbine bypass valve 47. The turbine bypass valve 47 may be used to adjust a bypass flow rate through the bypass conduit 49. In some embodiments, the bypass flow may be fluidly connected to the recirculation loop 52 downstream of the turbine 34.

In some embodiments, the at least a first portion of the compressed ambient gas flow 26 may be further compressed prior to delivery into the turbine combustor 32. The at least a first portion of the compressed ambient gas flow 26 may be further compressed by a booster compressor 24. The booster compressor 24 may be incorporated downstream from and in fluid connection with the main air compressor 12 and upstream of an in fluid connection with the turbine combustor 32. In some embodiments, the compressed ambient gas flow rate may be varied by adjusting the speed of the booster compressor 24 and/or by adjusting the inlet guide vanes of the booster compressor 24.

In some embodiments, a blower 42 may be used to increase the pressure of the recirculated low oxygen content gas flow 50. The blower 42 may be fluidly connected to the recirculation loop 52 upstream of or downstream from the recirculated gas flow cooler 40. The blower 42 may be configured to increase the pressure of the recirculated low oxygen content gas flow 50 prior to delivery into the turbine compressor 30 via the recirculation loop 52.

In some embodiments, an excess portion, if any, of the recirculated low oxygen content gas flow 50 may be vented from the gas turbine assembly. The power plant arrangement 10 may include a damper door 38 connected to the recirculation loop 52. The damper door 38 may be opened to vent a portion of the recirculated low oxygen gas content flow 50 to the atmosphere.

Control Method for a Master Train and a Slave Train

As used herein, the term "master train" refers to any gas turbine assembly that also includes a main air compressor. As used herein, the term "slave train" refers to any gas turbine assembly that does not also include a main air compressor. Thus, any given slave train requires at least one master train for operation.

In an embodiment, a method for controlling at least one master train of a stoichiometric exhaust gas recirculation power plant arrangement 100 is provided, wherein ambient air is compressed using a main air compressor 12 to form at least a first portion of a compressed ambient gas flow 26. In some embodiments, an air supply valve 15 that fluidly connects the main air compressor 12 to an inter-train conduit 19 may be opened. In some embodiments, a master air injection valve 25 that fluidly connects the inter-train conduit 19 to a master turbine combustor 32 may be opened. An excess portion, if any, of the at least a first portion of the compressed ambient gas flow 26 may be vented to the atmosphere via a master variable bleed valve 14.

At least a first portion of the compressed ambient gas flow 26, having a master compressed ambient gas flow rate, may be delivered to a master turbine combustor 32 that is fluidly connected to the main air compressor 12. A master fuel stream 28, having a master fuel stream flow rate, may also be delivered to the master turbine combustor 32. The at least a first portion of the compressed ambient gas flow 26 may then be mixed with at least a first portion of a master recirculated low oxygen content gas flow 50 and the master fuel stream 28 to form a master combustible mixture. The master combustible mixture may be burned in the master turbine combustor 32 to produce the master recirculated low oxygen content gas flow 50. In some embodiments, the master fuel stream flow rate may be controlled by a master gas control valve 27.

A master turbine 34 may be driven using the master recirculated low oxygen content gas flow 50, thereby causing the master turbine 34 to rotate. As used herein, the term "driven using the master recirculated low oxygen content gas flow" means the master recirculated low oxygen content gas flow 50 expands upon exit from the master turbine combustor 32 and upon entrance into the master turbine 34, thereby causing the master turbine 34 to rotate.

The rotation of the master turbine 34 may cause the master turbine shaft 22 and also the master turbine compressor 30 to rotate. The master turbine shaft 22 may rotate in a master turbine generator 20, such that rotation of the master turbine shaft 22 may cause the master turbine generator 20 to generate electricity. In embodiments, the master turbine compressor 30 may be fluidly connected to the master turbine combustor 32 such that the master turbine compressor 30 may compress and deliver the master recirculated low oxygen content gas flow 50 to the master turbine combustor 32.

At least a second portion of the master recirculated gas flow 50 from the output of the master turbine compressor 30 may be extracted through a master extraction conduit 48 which may be regulated by a master extraction valve 45. In some embodiments, the master extraction valve 45 may be fluidly connected to a master bypass conduit 49 at a point that is either upstream of or downstream of a master turbine bypass valve 47. In some embodiments, the master extraction conduit 48 may be fluidly connected to a master gas separation system such as a master carbon capture sequestration (CCS) system. In still other embodiments, the master gas separation system may produce a stream of concentrated carbon dioxide and concentrated nitrogen, both with a low oxygen content. In some embodiments, the master extraction valve 45 may be adjusted to maintain a constant mass balance in the master train of the power plant arrangement 100. As used herein, the term "constant mass balance" means that the system inputs, including fuel and air, are balanced with the system outputs via extraction, including carbon dioxide, nitrogen, and water.

The master compressed ambient gas flow rate and the master fuel stream flow rate may be adjusted to achieve substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. In some embodiments, the master compressed ambient gas flow rate and/or the master fuel stream flow rate may be adjusted based on measurements of oxygen and/or carbon dioxide present in the exhaust of the master turbine 34 and/or in the master recirculated low oxygen content gas flow 50.

The main air compressor 12 may further comprise adjustable inlet guide vanes to control the flow of air into the main air compressor 12. The inlet guide vanes of the main air compressor may be used to regulate the compressed ambient gas flow rate that is delivered to the turbine combustor 32. Additionally, the master turbine compressor 30 may further comprise adjustable inlet guide vanes to control the flow of air into the master turbine compressor 30.

As illustrated in FIG. 2, in some embodiments, the master turbine shaft 22 may be a "cold-end drive" configuration, meaning the master turbine shaft 22 may connect to the master turbine generator 20 at the compressor end of the turbine assembly. In other embodiments, the master turbine shaft 22 may be a "hot-end drive" configuration, meaning the master turbine shaft 22 may connect to the master turbine generator 20 at the master turbine end of the turbine assembly.

As used herein, the term "master recirculated low oxygen content gas flow" refers to the gas flow generated by the burning of the master combustible mixture in the master turbine combustor 32 and flowing through a master recirculation loop 52. In some embodiments, the term "low oxygen content" refers to an oxygen content of below about 5 vol %, below about 2 vol %, or below about 1 vol %. The concentration of oxygen present in the master recirculated low oxygen content gas flow 50 may be detected, upon exit from the master turbine compressor 30 using a first master oxygen sensor or upon exit from the master turbine 34 using a second master oxygen sensor or both.

In some embodiments, the master recirculated low oxygen content gas flow 50 may be directed from the master turbine 34 through the master recirculation loop 52 to a master heat recovery steam generator 36 for the generation of steam. A master steam turbine may be configured to generate additional electricity using the steam from the master heat recovery steam generator 36, and the master steam turbine may be connected to a master steam generator. In some embodiments, the master steam turbine may be arranged to be connected to the master turbine shaft 22. The master recirculated low oxygen content gas flow 50 may then be directed back into the master recirculation loop 52 to a master recirculated gas flow cooler 40. In still other embodiments, the master recirculation loop 52 may not contain a master heat recovery steam generator 36 and the master recirculated low oxygen content gas flow 50 may instead be introduced directly into the master recirculated gas flow cooler 40 upon exit from the master turbine 34. In other embodiments, the master recirculation loop 52 may not comprise the master recirculated gas flow cooler 40.

The master recirculated gas flow cooler 40 may be incorporated into the master recirculation loop 52 anywhere downstream from the master turbine 34. The master recirculated gas flow cooler 40 may be configured to lower the temperature of the master recirculated low oxygen content gas flow 50 to a suitable temperature for downstream delivery into the master turbine compressor 30 via the master recirculation loop 52. In some embodiments, a suitable temperature may be below about 66° C., below about 49° C., or below about 45° C.

In some embodiments, at least a third portion of the master recirculated low oxygen content gas flow 50 may be delivered from the master turbine compressor 30 to the master turbine 34 as a master secondary flow. The gas turbine assembly may further comprise a master secondary flow path 31 that delivers at least a third portion of the master recirculated low oxygen content gas flow 50 from the master turbine compressor 30 to the master turbine 34 as a master secondary flow. The master secondary flow may be used to cool and seal the master turbine 34, including individual components of the master turbine 34 such as the turbine shroud, the turbine nozzle, the turbine blade tip, the turbine bearing support housing, and the like. After cooling and sealing the master turbine 34 and any individual turbine components, the master secondary flow may be directed into the master recirculation loop 52 near the output of the master turbine 34.

In some embodiments, the master turbine combustor 32 may be bypassed with at least a portion of the master recirculated low oxygen content gas flow 50 using a master bypass conduit 49. The master bypass conduit 49 may be located downstream of the master turbine compressor 30 and may be in fluid connection with a portion of the master recirculated gas flow 50 from the output of the master turbine compressor 30. In some embodiments, a master bypass flow through the master bypass conduit 49 may be regulated by a master turbine bypass valve 47. The master turbine bypass valve 47 may be used to adjust a master bypass flow rate through the master bypass conduit 49. In some embodiments, the master bypass flow may be fluidly connected to the master recirculation loop 52 downstream of the master turbine 34.

In some embodiments, the at least a first portion of the compressed ambient gas flow 26 may be further compressed prior to delivery into the master turbine combustor 32. The at least a first portion of the compressed ambient gas flow 26 may be further compressed by a master booster compressor 24. The master booster compressor 24 may be incorporated downstream from and in fluid connection with the main air compressor 12 and upstream of an in fluid connection with the master turbine combustor 32. In some embodiments, the master compressed ambient gas flow rate may be varied by adjusting the speed of the master booster compressor 24 and/or by adjusting the inlet guide vanes of the master booster compressor 24.

In some embodiments, a master blower 42 may be used to increase the pressure of the master recirculated low oxygen content gas flow 50. The master blower 42 may be fluidly connected to the master recirculation loop 52 upstream of or downstream of the master recirculated gas flow cooler 40. The master blower 42 may be configured to increase the pressure of the master recirculated low oxygen content gas flow 50 prior to delivery into the master turbine compressor 30 via the master recirculation loop 52.

In some embodiments, an excess portion, if any, of the master recirculated low oxygen content gas flow 50 may be vented from the master train. The master train may include a master damper door 38 connected to the master recirculation loop 52. The master damper door 38 may be opened to vent a portion of the master recirculated low oxygen gas content flow 50 to the atmosphere.

In an embodiment, a method for controlling at least one slave train of a stoichiometric exhaust gas recirculation power plant arrangement 100 is provided. An inter-train valve 16 may be opened, fluidly connecting the slave train to the master train. Additionally, a slave air injection valve 65 may be opened to fluidly connect the inter-train conduit 19 to the slave turbine combustor 72. At least a second portion of the compressed ambient gas flow 66 may be delivered directly to a slave turbine combustor 72. An excess portion, if any, of the at least a second portion of the compressed ambient gas flow 66 may be vented to the atmosphere via a slave variable bleed valve 18.

At least a second portion of the compressed ambient gas flow 66, having a slave compressed ambient gas flow rate, may be delivered to a slave turbine combustor 72 that is fluidly connected to the main air compressor 12. A slave fuel stream 68, having a slave fuel stream flow rate, may also be delivered to the slave turbine combustor 72. The at least a second portion of the compressed ambient gas flow 66 may then be mixed with at least a first portion of a slave recirculated low oxygen content gas flow 90 and the slave fuel stream 68 to form a slave combustible mixture. The slave combustible mixture may be burned in the slave turbine combustor 72 to produce the slave recirculated low oxygen content gas flow 90. In some embodiments, the slave fuel stream flow rate may be controlled by a slave gas control valve 67.

A slave turbine 74 may be driven using the slave recirculated low oxygen content gas flow 90, thereby causing the slave turbine 74 to rotate. As used herein, the term "driven using the slave recirculated low oxygen content gas flow" means the slave recirculated low oxygen content gas flow 90 expands upon exit from the slave turbine combustor 72 and upon entrance into the slave turbine 74, thereby causing the slave turbine 74 to rotate.

The rotation of the slave turbine 74 may cause the slave turbine shaft 62 and also the slave turbine compressor 70 to rotate. The slave turbine shaft 62 may rotate in a slave turbine generator 60, such that rotation of the slave turbine shaft 62 may cause the slave turbine generator 60 to generate electricity. In embodiments, the slave turbine compressor 70 may be fluidly connected to the slave turbine combustor 72 such that the slave turbine compressor 70 may compress and deliver the slave recirculated low oxygen content gas flow 90 to the slave turbine combustor 72.

At least a second portion of the slave recirculated gas flow 90 from the output of the slave turbine compressor 70 may be extracted through a slave extraction conduit 88 which may be regulated by a slave extraction valve 85. In some embodiments, the slave extraction valve 85 may be fluidly connected to a slave bypass conduit 89 at a point that is either upstream of or downstream of a slave turbine bypass valve 87. In some embodiments, the slave extraction conduit 88 may be fluidly connected to a slave gas separation system such as a slave carbon capture sequestration (CCS) system. In still other embodiments, the slave gas separation system may produce a stream of concentrated carbon dioxide and concentrated nitrogen, both with a low oxygen content. In some embodiments, the slave extraction valve 85 may be adjusted to maintain a constant mass balance in the slave train of the power plant arrangement 100. As used herein, the term "constant mass balance" means that the system inputs, including fuel and air, are balanced with the system outputs via extraction, including carbon dioxide, nitrogen, and water.

The slave compressed ambient gas flow rate and the slave fuel stream flow rate may be adjusted to achieve substantially stoichiometric combustion. As used herein, the term "substantially stoichiometric combustion" means that the combustion reaction involves substantially stoichiometric burning of fuel and oxygen in the combustion system. In other terms, the oxygen content after the combustion reaction may be below about 5 vol %, below about 2 vol %, or below about 1 vol %. In some embodiments, the slave compressed ambient gas flow rate and/or the slave fuel stream flow rate may be adjusted based on measurements of oxygen and/or carbon dioxide present in the exhaust of the slave turbine 74 and/or in the slave recirculated low oxygen content gas flow 90.

The slave turbine compressor 70 may further comprise adjustable inlet guide vanes to control the flow of air into the slave turbine compressor 70.

As illustrated in FIG. 2, in some embodiments, the slave turbine shaft 62 may be a "cold-end drive" configuration, meaning the slave turbine shaft 62 may connect to the slave turbine generator 60 at the compressor end of the slave train. In other embodiments, the slave turbine shaft 62 may be a "hot-end drive" configuration, meaning the slave turbine shaft 62 may connect to the slave turbine generator 60 at the slave turbine end of the slave train.

As used herein, the term "slave recirculated low oxygen content gas flow" refers to the gas flow generated by the burning of the slave combustible mixture in the slave turbine combustor 72 and flowing through a slave recirculation loop 92. In some embodiments, the term "low oxygen content" refers to an oxygen content of below about 5 vol %, below about 2 vol %, or below about 1 vol %. The concentration of oxygen present in the slave recirculated low oxygen content gas flow 90 may be detected, upon exit from the slave turbine compressor 70 using a first slave oxygen sensor or upon exit from the slave turbine 74 using a second slave oxygen sensor or both.

In some embodiments, the slave recirculated low oxygen content gas flow 90 may be directed from the slave turbine 74 through the slave recirculation loop 92 to a slave heat recovery steam generator 76 for the generation of steam. A slave steam turbine may be configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave recirculated low oxygen content gas flow 90 may then be directed back into the slave recirculation loop 92 to a slave recirculated gas flow cooler 80. In still other embodiments, the slave recirculation loop 92 may not contain a slave heat recovery steam generator 76 and the slave recirculated low oxygen content gas flow 90 may instead be introduced directly into the slave recirculated gas flow cooler 80 upon exit from the slave turbine 74. In other embodiments, the slave recirculation loop 92 may not comprise the slave recirculated gas flow cooler 80.

The slave recirculated gas flow cooler 80 may be incorporated into the slave recirculation loop 92 anywhere downstream from the slave turbine 74. The slave recirculated gas flow cooler 80 may be configured to lower the temperature of the slave recirculated low oxygen content gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, at least a third portion of the slave recirculated low oxygen content gas flow 90 may be delivered from the slave turbine compressor 70 to the slave turbine 74 as a slave secondary flow. The slave train may further comprise a slave secondary flow path 71 that delivers at least a third portion of the slave recirculated low oxygen content gas flow 90 from the slave turbine compressor 70 to the slave turbine 74 as a slave secondary flow. The slave secondary flow may be used to cool and seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the slave turbine combustor 72 may be bypassed with at least a portion of the slave recirculated low oxygen content gas flow 90 using a slave bypass conduit 89. The slave bypass conduit 89 may be located downstream of the slave turbine compressor 70 and may be in fluid connection with a portion of the slave recirculated gas flow 90 from the output of the slave turbine compressor 70. In some embodiments, a slave bypass flow through the slave bypass conduit 89 may be regulated by a slave turbine bypass valve 87. The slave turbine bypass valve 87 may be used to adjust a slave bypass flow rate through the slave bypass conduit 89. In some embodiments, the slave bypass flow may be fluidly connected to the slave recirculation loop 92 downstream of the slave turbine 74.

In some embodiments, the at least a second portion of the compressed ambient gas flow 66 may be further compressed prior to delivery into the slave turbine combustor 72. The at least a second portion of the compressed ambient gas flow 66 may be further compressed by a slave booster compressor 64. The slave booster compressor 64 may be incorporated downstream from and in fluid connection with the main air compressor 12 and upstream of an in fluid connection with the slave turbine combustor 72. In some embodiments, the slave compressed ambient gas flow rate may be varied by adjusting the speed of the slave booster compressor 64 and/or the inlet guide vanes of the slave booster compressor 64.

In some embodiments, a slave blower 82 may be used to increase the pressure of the slave recirculated low oxygen content gas flow 90. The slave blower 82 may be fluidly connected to the slave recirculation loop 92 upstream of or downstream from the slave recirculated gas flow cooler 80. The slave blower 82 may be configured to increase the pressure of the slave recirculated low oxygen content gas flow 90 prior to delivery into the slave turbine compressor 70 via the slave recirculation loop 92.

In some embodiments, an excess portion, if any, of the slave recirculated low oxygen content gas flow 90 may be vented from the slave train. The slave train may include a slave damper door 78 connected to the slave recirculation loop 92. The slave damper door 78 may be opened to vent a portion of the slave recirculated low oxygen gas content flow 90 to the atmosphere.

Other configurations and methods of operation are provided by U.S. patent applications including "Power Plant and Method of Operation" to Daniel Snook, Lisa Wichmann, Sam Draper, Noemie Dion Ouellet, and Scott Rittenhouse (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant Start-Up Method" to Daniel Snook, Lisa Wichmann, Sam Draper, Noemie Dion Ouellet, and Scott Rittenhouse (filed Aug. 25, 2011), "Power Plant and Method of Use" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper and Kenneth Kohl (filed Aug. 25, 2011), "Power Plant and Method of Operation" to Sam Draper (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated in full by reference herein.

It should be apparent that the foregoing relates only to the preferred embodiments of the present invention and that numerous changes and modifications may be made herein without departing from the spirit and the scope of the invention as defined by the following claims and equivalents thereof.

We claim:

1. A method for controlling a stoichiometric exhaust gas recirculation power plant arrangement, comprising the steps of:

compressing ambient air into a compressed ambient gas flow with at least one main air compressor;

delivering at least a first portion of the compressed ambient gas flow through a first conduit, with a compressed ambient gas flow rate, to a turbine combustor that is fluidly connected via the first conduit to the at least one main air compressor;

delivering a fuel stream, having a fuel stream flow rate, to the turbine combustor for mixing with the at least first portion of the compressed ambient gas flow delivered from the at least one main air compressor via the first conduit and with at least a first portion of a recirculated low oxygen content gas flow delivered via a second conduit from a turbine compressor to form a combustible mixture;

burning the combustible mixture in the turbine combustor and thereby forming the recirculated low oxygen content gas flow and driving a turbine connected to the turbine compressor via a turbine shaft;

recirculating the at least first portion of the recirculated low oxygen content gas flow from the turbine to the turbine compressor using a recirculation loop;

bypassing at least a portion of the at least first portion of the recirculated low oxygen content gas flow from the turbine combustor and turbine with a bypass conduit having an inlet on the recirculation loop between the turbine compressor and the turbine combustor and an outlet on the recirculation loop downstream of the turbine;

adjusting at least one of the compressed ambient gas flow rate and the fuel stream flow rate to achieve substantially stoichiometric combustion;

venting an excess portion, if any, of the at least first portion of the compressed ambient gas flow at a location between the at least one main air compressor and the turbine combustor;

extracting at least a second portion of the recirculated low oxygen content gas flow using an extraction conduit that is fluidly connected to the bypass conduit, such that the mass balance of the power plant remains substantially constant; and cooling the turbine by delivering a secondary flow through a secondary flow path, wherein the secondary flow path delivers at least a third portion of the recirculated low oxygen content gas flow from the turbine compressor to the turbine for cooling and sealing the turbine and thereafter into the recirculation loop.

2. The method of claim 1, wherein the step of adjusting the compressed ambient gas flow rate comprises adjusting a plurality of inlet guide vanes of the at least one main air compressor.

3. The method of claim 1, further comprising delivering the at least first portion of the compressed ambient gas flow to a booster compressor, wherein the booster compressor is configured to compress and to deliver the at least first portion of the compressed ambient gas to flow to the turbine combustor.

4. The method of claim 3, wherein the step of adjusting the compressed ambient gas flow rate comprises adjusting a speed or a plurality of inlet guide vanes of the booster compressor.

5. The method of claim 1, wherein the step of adjusting the fuel stream flow rate comprises adjusting one or more gas control valves.

6. The method of claim 1, wherein the step of adjusting the compressed ambient gas flow rate comprises adjusting a variable bleed valve, in fluid communication with the at least one main air compressor, to vent a portion of the at least first portion of the compressed ambient gas flow to the atmosphere.

7. The method of claim 1, wherein the step of extracting further comprises adjusting an extraction valve in fluid communication with the extraction conduit.

8. A method for controlling at least one master train of a stoichiometric exhaust gas recirculation power plant arrangement, comprising the steps of:

compressing ambient air into a compressed ambient gas flow with at least one main air compressor;

delivering at least a first portion of the compressed ambient gas flow, with a master compressed ambient gas flow rate, to a master turbine combustor via a first master conduit that is fluidly connected to the at least one main air compressor;

delivering a master fuel stream, having a master fuel stream flow rate, to the master turbine combustor for mixing with the at least first portion of the compressed ambient gas flow from the at least one main air compressor and with at least a first portion of a master recirculated low oxygen content gas flow delivered from a turbine compressor via a second master conduit to the master turbine combustor to form a master combustible mixture;

burning the master combustible mixture in the master turbine combustor and thereby forming the master recirculated low oxygen content gas flow and driving a master turbine connected to the master turbine compressor via a master turbine shaft;

recirculating the at least first portion of the master recirculated low oxygen content gas flow from the master turbine to the master turbine compressor using a master recirculation loop;

bypassing at least a portion of the at least first portion of the master recirculated low oxygen content flow from the master turbine combustor and master turbine with a master bypass conduit having an inlet on the master recirculation loop between the turbine compressor and the master turbine combustor and outlet on the master recirculation loop downstream of the master turbine;

adjusting at least one of the master compressed ambient gas flow rate and the master fuel stream flow rate to achieve substantially stoichiometric combustion;

venting an excess portion, if any, of the at least first portion of the compressed ambient gas flow at a location between the at least one main air compressor and the master turbine combustor;

extracting at least a second portion of the master recirculated low oxygen content gas flow using a master extraction conduit that is fluidly connected to the master bypass conduit such that the mass balance of the power plant remains constant; and cooling the master turbine by delivering a master secondary flow through a master secondary flow path, wherein the master secondary flow path delivers at least a third portion of the master recirculated low oxygen content gas flow from the master turbine compressor to the master turbine for cooling and sealing the master turbine and thereafter into the master recirculation loop.

9. The method of claim 8, wherein the step of adjusting the compressed ambient gas flow rate comprises adjusting a plurality of inlet guide vanes of the at least one main air compressor.

10. The method of claim 8, further comprising delivering the at least first portion of the compressed ambient gas flow to a master booster compressor, wherein the master booster compressor is configured to compress and to deliver the at least first portion of the compressed ambient gas to flow to the master turbine combustor.

11. The method of claim 8, wherein the step of adjusting the master fuel stream flow rate comprises adjusting one or more master gas control valves.

12. The method of claim 8, wherein the step of adjusting the compressed ambient gas flow rate comprises adjusting a master variable bleed valve, in fluid communication with the at least one main air compressor, to vent a portion of the at least first portion of the compressed ambient gas flow to the atmosphere.

13. The method of claim 8, wherein the step of extracting further comprises adjusting a master extraction valve in fluid communication with the master extraction conduit.

14. The method of claim 9, further comprising controlling at least one slave train of a stoichiometric exhaust gas recirculation power plant arrangement, comprising the steps of:

opening a slave air injection valve that fluidly connects an inter-train conduit to a slave turbine combustor;

delivering at least a second portion of the compressed ambient gas flow via a first slave conduit, with a slave compressed ambient gas flow rate, to a slave turbine combustor that is fluidly connected to the at least one main air compressor;

delivering a slave fuel stream, having a slave fuel stream flow rate, to the slave turbine combustor for mixing with the at least a second portion of the compressed ambient gas flow from the at least one main air compressor and with at least a first portion of a slave recirculated low oxygen content gas flow from a slave turbine compressor delivered via a second slave conduit to the slave turbine combustor to form a slave combustible mixture;

burning the slave combustible mixture in the slave turbine combustor and thereby forming the slave recirculated low oxygen content gas flow and driving a slave turbine connected to the slave turbine compressor via a slave turbine shaft;

recirculating the at least first portion of the slave recirculated low oxygen content gas flow from the slave turbine to the slave turbine compressor using a slave recirculation loop;

adjusting at least one of the slave compressed ambient gas flow rate and the slave fuel stream flow rate to achieve substantially stoichiometric combustion;

venting an excess portion, if any, of the at least second portion of the compressed ambient gas flow at a location between the at least one main air compressor and the slave turbine combustor;

extracting at least a second portion of the slave recirculated low oxygen content gas flow using a slave extraction conduit that is fluidly connected to the slave train, such that the mass balance of the power plant remains constant; and cooling the slave turbine by delivering a slave secondary flow through a slave secondary flow path, wherein the slave secondary flow path delivers at least a third portion of the slave recirculated low oxygen content gas flow from the slave turbine compressor to the slave turbine for cooling and sealing the slave turbine and thereafter into the slave recirculation loop.

15. The method of claim 14, wherein the step of adjusting the slave fuel stream flow rate comprises adjusting one or more slave gas control valves.

16. The method of claim 14, wherein the step of adjusting the slave compressed ambient gas flow rate comprises adjusting a slave variable bleed valve, in fluid communication with the at least one main air compressor, to vent a portion of the at least second portion of the compressed ambient gas flow to the atmosphere.

17. The method of claim 14, wherein the step of extracting further comprises adjusting a slave extraction valve in fluid communication with the slave extraction conduit.

* * * * *